US012003937B2

(12) United States Patent
Chen

(10) Patent No.: US 12,003,937 B2
(45) Date of Patent: Jun. 4, 2024

(54) SPEAKER

(71) Applicant: AAC Microtech (Changzhou) Co., Ltd., Changzhou (CN)

(72) Inventor: Weimin Chen, Shenzhen (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 177 days.

(21) Appl. No.: 17/880,702

(22) Filed: Aug. 4, 2022

(65) Prior Publication Data

US 2023/0199395 A1 Jun. 22, 2023

(30) Foreign Application Priority Data

Dec. 16, 2021 (CN) ......................... 202123177593.3

(51) Int. Cl.

| | |
|---|---|
| ***H04R 9/06*** | (2006.01) |
| ***H04R 1/06*** | (2006.01) |
| ***H04R 1/28*** | (2006.01) |
| ***H04R 9/02*** | (2006.01) |
| ***H04R 9/04*** | (2006.01) |

(52) U.S. Cl.

CPC ............... *H04R 9/025* (2013.01); *H04R 1/06* (2013.01); *H04R 1/2811* (2013.01); *H04R 9/043* (2013.01); *H04R 9/045* (2013.01); *H04R 9/06* (2013.01); *H04R 9/063* (2013.01); *H04R 2209/024* (2013.01); *H04R 2209/041* (2013.01)

(58) Field of Classification Search

CPC ........ H04R 1/06; H04R 1/2811; H04R 9/025; H04R 9/043; H04R 9/045; H04R 9/06; H04R 9/063; H04R 2209/024; H04R 2209/041

See application file for complete search history.

(56) References Cited

U.S. PATENT DOCUMENTS

| | | | | |
|---|---|---|---|---|
| 11,671,759 B2 * | 6/2023 | Jin | ........................... | H04R 9/06 381/433 |
| 11,800,289 B2 * | 10/2023 | Yan | ........................ | H04R 9/043 |
| 11,805,369 B2 * | 10/2023 | Xiao | ...................... | H04R 31/00 |
| 2022/0174409 A1 * | 6/2022 | Yu | ............................ | H04R 9/06 |

* cited by examiner

*Primary Examiner* — Huyen D Le

(74) *Attorney, Agent, or Firm* — W&G Law Group

(57) ABSTRACT

A speaker includes a frame, a vibration system, and a magnetic circuit system. The vibration system and the magnetic circuit system are respectively disposed on the frame. The vibration system includes a sound film, flexible circuit boards, a connecting rack, and a voice coil. The flexible circuit boards are disposed at intervals with the sound film. The connecting rack is connected with the sound film and the flexible circuit boards. The voice coil is fixed to the connecting rack. The voice coil includes a first voice coil and a second voice coil, and the second voice coil surrounds outside the first voice coil. The speaker of the present disclosure effectively solves the problem of supplying power to the first voice coil during the voice coil driving. The voice coil driving effectively improves the BL, provides a larger driving force, and improves sensitivity, so that performance of the speaker is better.

9 Claims, 4 Drawing Sheets

SPEAKER

TECHNICAL FIELD

The present disclosure relates to the field of electroacoustic conversion, and in particular to a speaker for portable electronic products.

BACKGROUND

A speaker is configured as a sound playing device for portable electronic products, and performance of the speaker further put forward higher requirements since sound playing requirements of people are increased. How to have a greater frequency response output under a same voltage becomes a focus of general research in industry.

At present, one important factor to limit the speaker frequency response output is BL (magnetic force) of the speaker. In general, the higher the BL of the speaker, the larger a displacement of a sound film under the same voltage, and the higher sensitivity of the speaker. It has been found through research that the BL is effectively improved through a method of dual voice coil driving. However, there is a technical problem existing in the method of the dual voice coil driving where an outer voice coil surrounds an inner voice coil, that is how to supply power to the inner voice coil.

Therefore, it is necessary to provide a speaker to solve above technical problems.

SUMMARY

The present disclosure aims at overcoming above technical problems, and provides a speaker to effectively solve the problem of supplying power to an inner voice coil during double voice coils driving.

In order to achieve above purpose, the present disclosure provides the speaker, including a frame, a vibration system, and a magnetic circuit system. The vibration system and the magnetic circuit system are respectively disposed on the frame. The vibration system includes a sound film, flexible circuit boards, a connecting rack, and a voice coil. The flexible circuit boards are disposed on one side, close to the magnetic circuit system, of the sound film. The flexible circuit boards are disposed at intervals with the sound film. The connecting rack is disposed between the sound film and the flexible circuit boards, and the connecting rack is connected with the sound film and the flexible circuit boards. The voice coil is fixed to the connecting rack to drive the sound film to vibrate and produce sound. The voice coil includes a first voice coil and a second voice coil, and the second voice coil surrounds outside the first voice coil. The connecting rack includes a main body portion, flanging portions, and supporting portions. The main body portion is fixed to the sound film. Each of the flanging portions extends from the main body portion toward a direction close to the magnetic circuit system. Each of the supporting portions extends from the main body portion in the direction close to the magnetic circuit system and is disposed on an outer side of each of the flanging portions. The second voice coil is fixed to the flanging portions, notches are defined on the flanging portions, and the supporting portions are fixed to the flexible circuit boards. Conductive paths are defined on the connecting rack, the conductive paths are electrically connected with the first voice coil and the flexible circuit boards, and the conductive paths pass through the notches of the flanging portions and extend into the flexible circuit boards through the supporting portions. The first voice coil and the second voice coil are electrically connected to an external power supply through the flexible circuit boards.

As an improvement, the conductive path is formed through a laser direct molding process.

As an improvement, an insulating layer is disposed between the conductive paths and the connecting rack.

As an improvement, the main body portion includes a first portion, second portions, and connecting portions. The second portions are annular and surround an outer side of the first portion. The connecting portions are connected to the first portion and the second portions. Each of the flanging portions extends from an inner periphery of a respective one of the second portions between adjacent two of the connecting portions. The supporting portions are disposed at a corner portion of each of the second portions. The first voice coil is fixed to the first portion.

As an improvement, the magnetic circuit system includes a lower clamping plate, a first magnetic steel, a second magnetic steel, third magnetic steels, a first pole core, a second pole core, and a third pole core. The first magnetic steel is disposed on the lower clamping plate. The second magnetic steel is annular, and the second magnetic steel is disposed on the lower clamping plate and surrounds the first magnetic steel. The third magnetic steels are disposed on the lower clamping plate and disposed outside the second magnetic steel. The first pole core is attached to the first magnetic steel, the second pole core is attached to the second magnetic steel, and the third pole core is attached to the third magnetic steels. The first magnetic steel and the second magnetic steel are disposed at intervals to form a first gap. The third magnetic steels and the second magnetic steel are disposed at intervals to form second gaps. The first voice coil is inserted into the first gap, and the second voice coil is inserted into the second gaps.

As an improvement, a magnetic pole of one side, close to the lower clamping plate, of the first magnetic steel is opposite to a magnetic pole of one side, close to the lower clamping plate, of the second magnetic steel. A magnetic pole of one side, close to the lower clamping plate, of each of the third magnetic steels is opposite to the magnetic pole of one side, close to the lower clamping plate, of the second magnetic steel. Directions of currents passing through the first voice coil and the second voice coil are opposite.

As an improvement, each of the flexible circuit boards includes an outer fixing portion, an inner fixing portion, and a pair of elastic force arms. The outer fixing portion is fixed to the frame, the inner fixing portion is fixed to the supporting portions, and the pair of the elastic force arms is respectively connected to the outer fixing portion and the inner fixing portion. The pair of the elastic force arms is symmetrically disposed on two sides of one of the third magnetic steels. Each of the pair of the elastic force arms is disposed in a gap formed between adjacent two of the third magnetic steels.

As an improvement, the third pole core is annular, and the outer fixing portion is at least partially fixed to the third pole core.

As an improvement, the vibration system further includes vibrating diaphragms, and the vibrating diaphragms are attached to one side, distal from the sound film, of each of the flexible circuit boards. The vibrating diaphragms are in one-to-one correspondence with the elastic force arms.

The speaker of the present disclosure effectively solves the problem of supplying power to the first voice coil (the inner voice coil) during the voice coil driving. The voice coil driving effectively improves the BL, provides a larger driving force, and improves sensitivity, so that performance of the speaker is better.

BRIEF DESCRIPTION OF DRAWINGS

In order to more clearly illustrate technical solutions in embodiments of the present disclosure, drawings required in description of the embodiments are briefly described below. Obviously, the drawings in the following description are merely some embodiments of the present disclosure. For a person of ordinary skill in art, other drawings may be obtained according to the drawings without creative efforts.

DETAILED DESCRIPTION OF EMBODIMENTS

Technical solutions in embodiments of the present disclosure are clearly and completely described below with reference to accompanying drawings in the embodiments of the present disclosure. Obviously, the described embodiments are only a part of the embodiments of the present disclosure, not all of the embodiments. Based on the embodiments of the present disclosure, all other embodiments obtained by a person of ordinary skill in art without creative efforts shall fall within a protection scope of the present disclosure.

Figure 1:
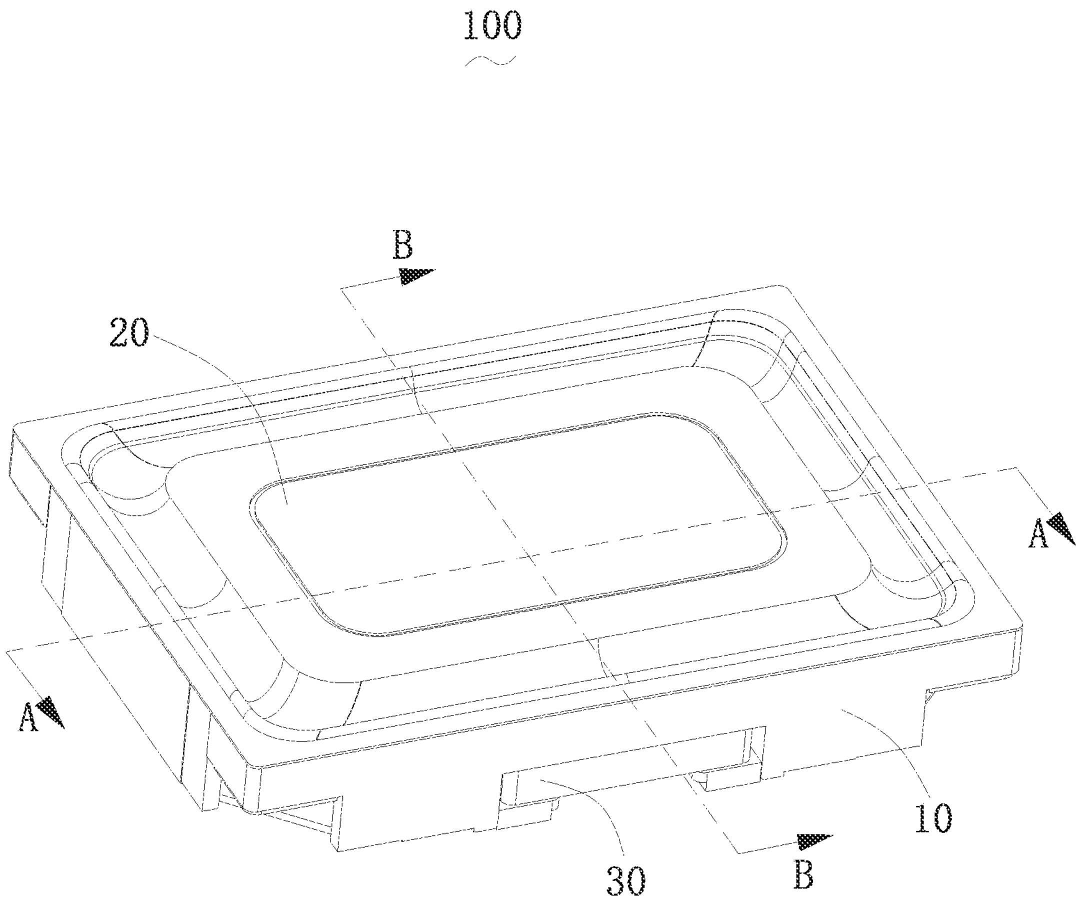
FIG. 1 is a three-dimensional schematic diagram of a speaker according to one embodiment of the present disclosure.
Figure 2:
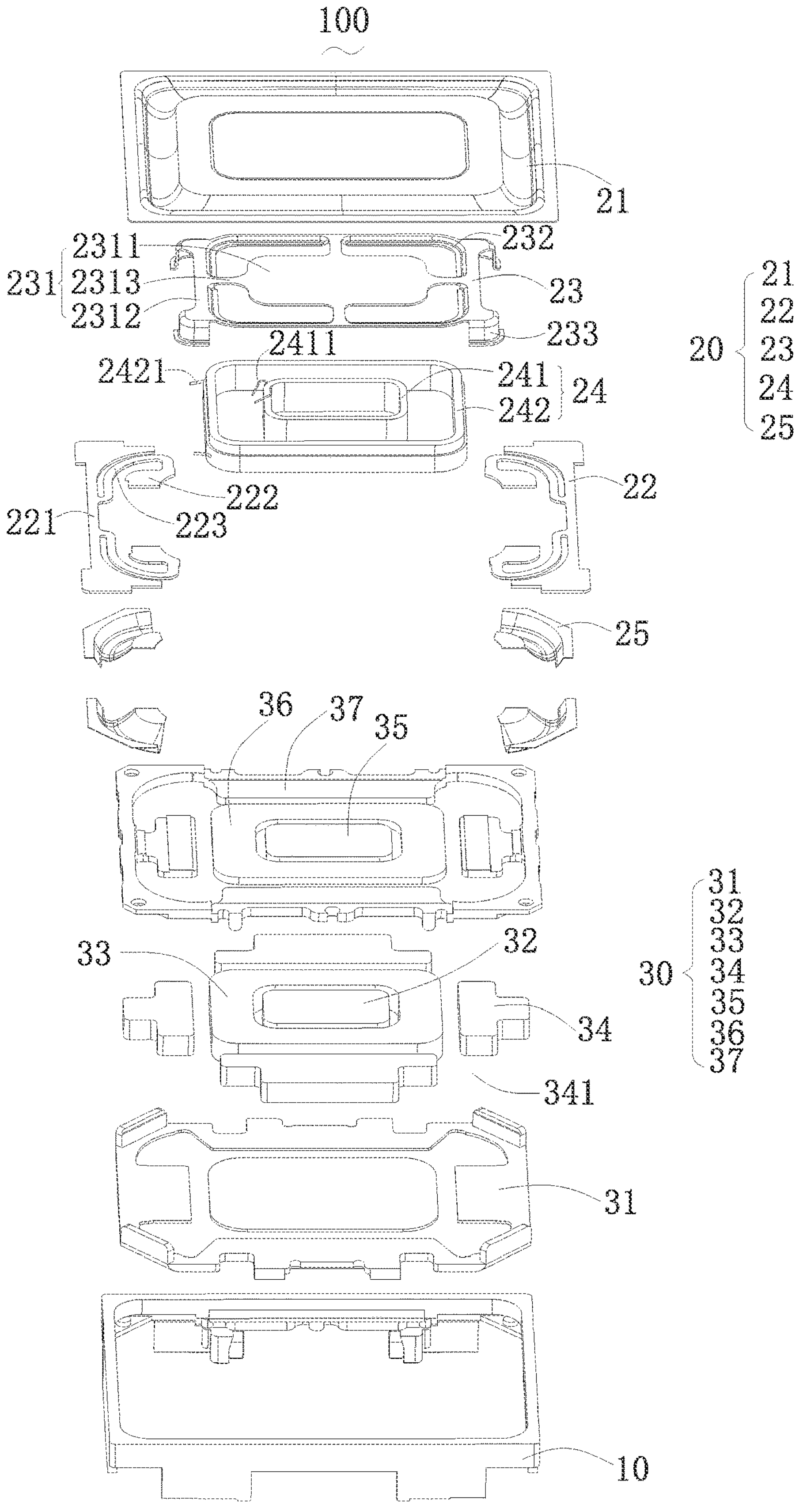
FIG. 2 is an exploded three-dimensional schematic diagram of the speaker shown in FIG. 1.
Figure 3:
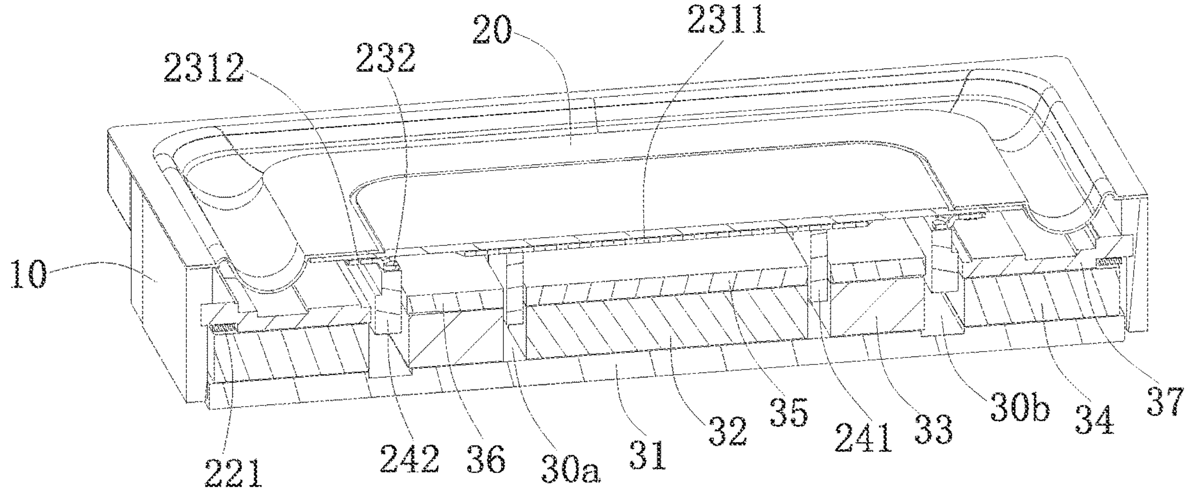
FIG. 3 is a cross-sectional schematic diagram taken along the line A-A shown in FIG. 1.
Figure 4:
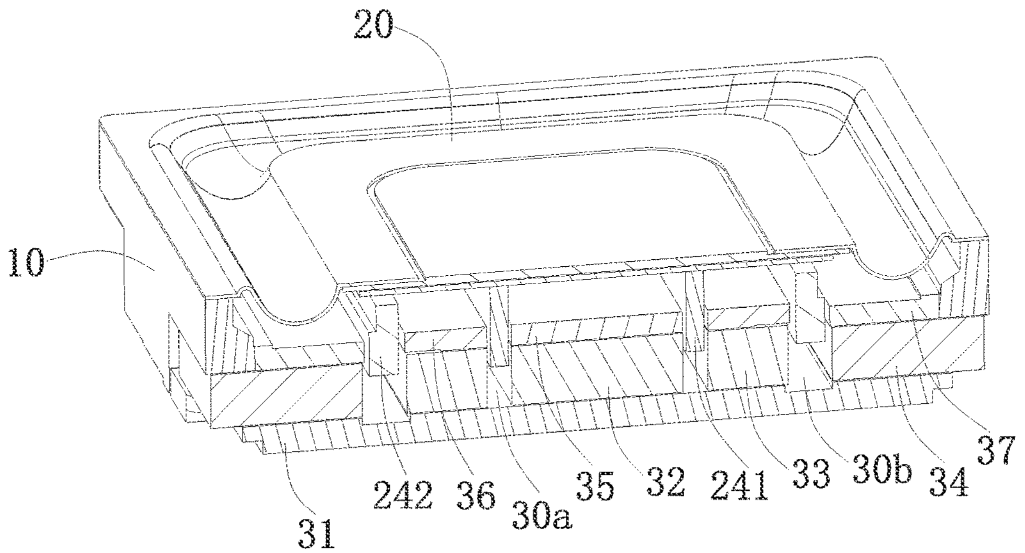
FIG. 4 is a cross-sectional schematic diagram taken along the line B-B shown in FIG. 1.
Figure 5:
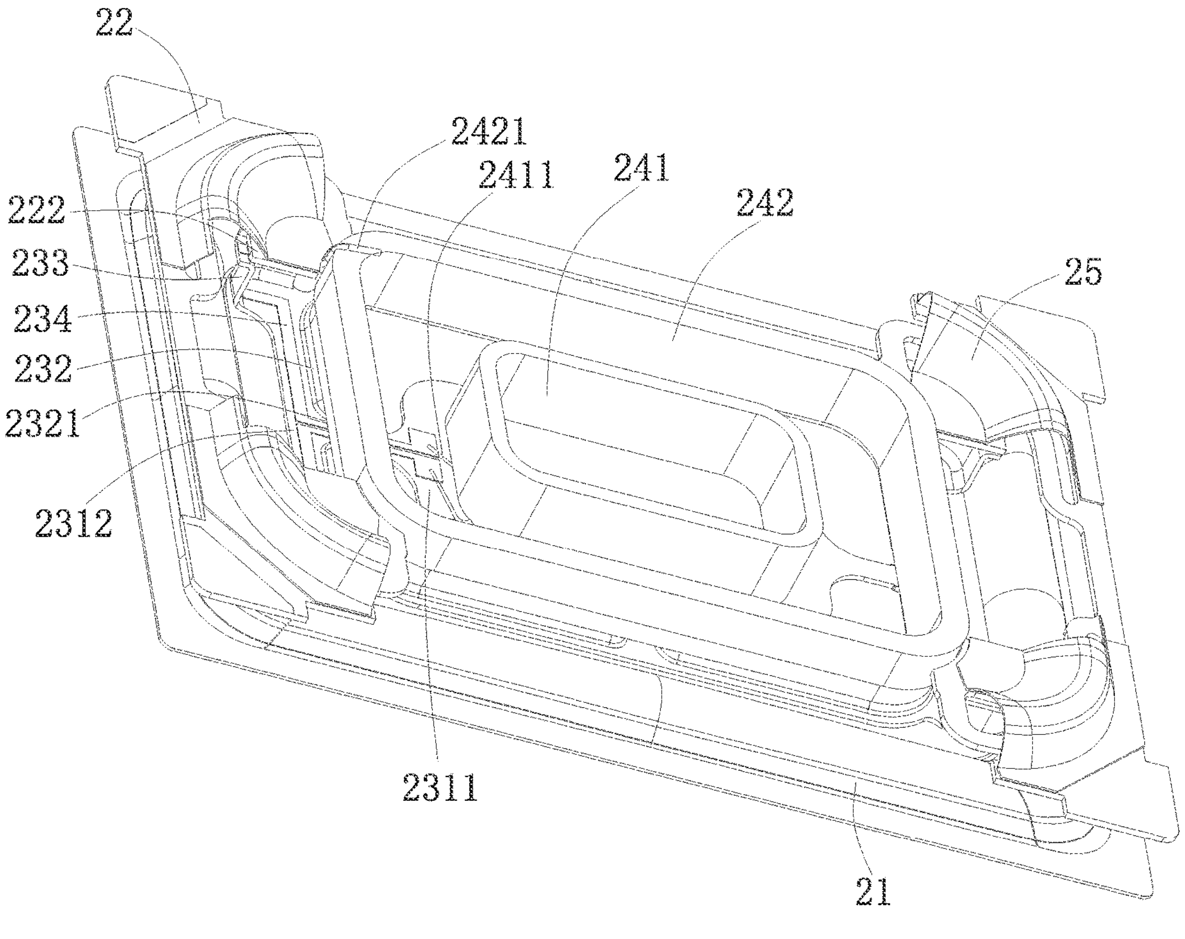
FIG. 5 is a three-dimensional schematic diagram of a vibration system of the speaker shown in FIG. 1.

Referring to FIGS. 1-5, a speaker 100 provided by the present disclosure includes a frame 10, a vibration system 20, and a magnetic circuit system 30. The vibration system 20 and the magnetic circuit system 30 are respectively disposed on the frame 10.

The vibration system 20 includes a sound film 21, flexible circuit boards 22, a connecting rack 23, and a voice coil 24. The flexible circuit boards 22 are disposed on one side, close to the magnetic circuit system 30, of the sound film 21. The flexible circuit boards 22 are disposed at intervals with the sound film 21. The connecting rack 23 is disposed between the sound film 21 and the flexible circuit boards 22, and the connecting rack is connected with the sound film 21 and the flexible circuit boards 22. The voice coil 24 is fixed to the connecting rack 23 to drive the sound film 21 to vibrate and produce sound.

The voice coil 24 includes a first voice coil 241 and a second voice coil 242, and the second voice coil 242 surrounds outside the first voice coil 241. The connecting rack 23 includes a main body portion 231, flanging portions 232, and supporting portions 233. The main body portion 231 is fixed to the sound film 21, each of the flanging portions 232 extends from the main body portion 231 to a direction close to the magnetic circuit system 30, each of the supporting portion 233 extends from the main body portion 231 in the direction close to the magnetic circuit system 30 and is disposed on an outer side of each of the flanging portions 232. The second voice coil 242 is fixed to the flanging portions 232. Notches 2321 are defined on the flanging portions 232. The supporting portions 233 are fixed to the flexible circuit boards 22. Conductive paths 234 are defined on the connecting rack 23. The conductive paths 234 are electrically connected with the first voice coil 241 and the flexible circuit boards 22, and the conductive paths 234 pass through the notches 2321 of the flanging portions 232 to the flexible circuit boards 22 through the supporting portions 233. A lead 2411 of the first voice coil 241 is welded to the conductive paths 234, a lead 2421 of the second voice coil 242 is directly welded to the flexible circuit boards 22, and the first voice coil 241 and the second voice coil 242 are electrically connected to an external power supply through the flexible circuit boards 22.

The conductive paths 234 are formed on the connecting rack 23 through a laser direct molding process. If the connecting rack 23 is conductive, an insulating layer is further disposed between the conductive paths 234 and the connecting rack 23.

As an improvement, the main body portion 231 includes a first portion 2311, second portions 2312, and connecting portions 2313. The second portions 2312 are annular and surround an outer side of the first portion 2311. The connecting portions 2313 are connected to the first portion 2311 and the second portions 2312. The flanging portions 232 extend from an inner periphery of each of the second portions 2312 between adjacent two of the connecting portions 2313. The supporting portions 233 is disposed at a corner portion of each of the second portions 2312. The first voice coil 2311 is fixed to the first portion 241.

The magnetic circuit system 30 includes a lower clamping plate 31, a first magnetic steel 32, a second magnetic steel 33, third magnetic steels 34, a first pole core 35, a second pole core 36, and a third pole core 37. The first magnetic steel 32 is disposed on the lower clamping plate 31. The second magnetic steel 33 is annular, and the second magnetic steel 33 is disposed on the lower clamping plate 31 and surrounds the first magnetic steel 32. The third magnetic steels 34 are disposed on the lower clamping plate 31 and disposed outside the second magnetic steel 33. The first pole core 35 is attached to the first magnetic steel 32, the second pole core 36 is attached to the second magnetic steel 33, and the third pole core 37 is attached to the third magnetic steels 34. The first magnetic steel 32 and the second magnetic steel 33 are disposed at intervals to form a first gap 30*a*, and the third magnetic steels 34 and the second magnetic steel 33 are disposed at intervals to form second gaps 30*b*. The first voice coil 241 is inserted into the first gap 30*a*, and the second voice coil 242 is inserted into the second gaps 30*b*. A magnetic pole of one side, close to the lower clamping plate 31, of the first magnetic steel 32 is opposite to a magnetic pole of one side, close to the lower clamping plate 31, of the second magnetic steel 33. A magnetic pole of one side, close to the lower clamping plate 31, of each of the third magnetic steels 34 is opposite to the magnetic pole of one side, close to the lower clamping plate 31, of the second magnetic steel 33. Directions of currents passing through the first voice coil 241 and the second voice coil 242 are opposite.

As an improvement, there are two flexible circuit boards 22 disposed, and the two flexible circuit boards 22 are respectively disposed on two short axis sides of the speaker 100. Each of the flexible circuit boards 22 includes an outer fixing portion 221, an inner fixing portion 222, and a pair of elastic force arms 223. The outer fixing portion 221 is fixed to the frame 10, the inner fixing portion 222 is fixed to the supporting portion 233, and the pair of the elastic force arms 223 is respectively connected to the outer fixing portion 221 and the inner fixing portion 222. There are four third magnetic steels 34 disposed, and the four third magnetic steels 34 are respectively disposed on the two short axis sides of the speaker 100 and two long axis sides of the speaker 100. A gap 341 is formed between adjacent two of the four third magnetic steels 34. The pair of the elastic force arms 223 is symmetrically disposed on two sides of one of the third magnetic steels 34 disposed on a short axis side of the speaker 100. Each of the pair of the elastic force arms 223 is disposed in the gap 341 formed between the adjacent two of the third magnetic steels 34. Such an arrangement enables the short axis sides of the flexible circuit boards 22 to be disposed with the third magnetic steels 34 at the same time, which enhances magnetic performance of the magnetic circuit system 30.

As an improvement, the third pole core 37 is annular, and the annular third pole core 37 couples to the four third magnetic steels 34 which are dispersed, which enhances structural strength and the magnetic performance of the magnetic circuit system 30. The outer fixing portion 221 is at least partially fixed to the third pole core 37, which avoids structural limitation of the frame 10 through the at least partially portion of the outer fixing portion 221.

As an improvement, the vibration system 20 further includes vibrating diaphragms 25, the vibrating diaphragms 25 are attached to one side, distal from the sound film 21, of each of the flexible circuit boards 22. The vibrating diaphragms 25 are in one-to-one correspondence with the elastic force arms 223. An arrangement of the vibrating diaphragms 25 improves stability and compliance of vibration of the flexible circuit boards 22.

The speaker of the present disclosure effectively solves the problem of supplying power to the first voice coil (the inner voice coil) during the voice coil driving. The voice coil driving effectively improves the BL, provides a larger driving force, and improves sensitivity, so that performance of the speaker is better.

It should be noted that the double voice coils appearing herein are not limited to only two voice coils, and two or more voice coils are included. The inner voice coil and an outer voice coil only represent inner and outer portions of relative positions and do not limit specific positions of the voice coils.

The above are only the embodiments of the present disclosure. It should be noted that, for the person of ordinary skill in the art, improvements are made without departing from concepts of the present disclosure, but these are all within the protection scope of the present disclosure.

What is claimed is:

1. A speaker, comprising:

a frame;

a vibration system; and a magnetic circuit system;

wherein the vibration system and the magnetic circuit system are respectively disposed on the frame; the vibration system comprises a sound film, flexible circuit boards, a connecting rack, and a voice coil; the flexible circuit boards are disposed on one side, close to the magnetic circuit system, of the sound film; the flexible circuit boards are disposed at intervals with the sound film; the connecting rack is disposed between the sound film and the flexible circuit boards, and the connecting rack is connected with the sound film and the flexible circuit boards; the voice coil is fixed to the connecting rack to drive the sound film to vibrate and produce sound; the voice coil comprises a first voice coil and a second voice coil, the second voice coil surrounds outside the first voice coil; the connecting rack comprises a main body portion, flanging portions, and supporting portions; the main body portion is fixed to the sound film, each of the flanging portions extends from the main body portion toward a direction close to the magnetic circuit system, each of the supporting portions extends from the main body portion in the direction close to the magnetic circuit system and is disposed on an outer side of each of the flanging portions; the second voice coil is fixed to the flanging portions, notches are defined on the flanging portions, the supporting portions are fixed to the flexible circuit boards; conductive paths are defined on the connecting rack, the conductive paths are electrically connected with the first voice coil and the flexible circuit boards, the conductive paths pass through the notches of the flanging portions and extend into the flexible circuit boards through the supporting portions, and the first voice coil and the second voice coil are electrically connected to an external power supply through the flexible circuit boards.

2. The speaker according to claim 1, wherein the conductive paths are formed through a laser direct molding process.

3. The speaker according to claim 1, wherein an insulating layer is disposed between the conductive paths and the connecting rack.

4. The speaker according to claim 1, wherein the main body portion comprises a first portion, second portions, and connecting portions; the second portions are annular and surround an outer side of the first portion, the connecting portions are connected to the first portion and the second portions, each of the flanging portions extends from an inner periphery of a respective one of the second portions between adjacent two of connecting portions, the supporting portions are disposed at an corner portion of each of the second portions, and the first voice coil is fixed to the first portion.

5. The speaker according to claim 1, wherein the magnetic circuit system comprises a lower clamping plate, a first magnetic steel, a second magnetic steel, third magnetic steels, a first pole core, a second pole core, and a third pole core; the first magnetic steel is disposed on the lower clamping plate, the second magnetic steel is annular, the second magnetic steel is disposed on the lower clamping plate and surrounds the first magnetic steel, the third magnetic steels are disposed on the lower clamping plate and disposed outside the second magnetic steel; the first pole core is attached to the first magnetic steel, the second pole core is attached to the second magnetic steel, the third pole core is attached to the third magnetic steels; the first magnetic steel and the second magnetic steel are disposed at intervals to form a first gap, the third magnetic steels and the second magnetic steel are disposed at intervals to form second gaps, the first voice coil is inserted into the first gap, and the second voice coil is inserted into the second gaps.

6. The speaker according to claim 5, wherein a magnetic pole of one side, close to the lower clamping plate, of the first magnetic steel is opposite to a magnetic pole of one side, close to the lower clamping plate, of the second magnetic steel; a magnetic pole of one side, close to the lower clamping plate, of each of the third magnetic steels is opposite to the magnetic pole of one side, close to the lower clamping plate, of the second magnetic steel; and directions of currents passing through the first voice coil and the second voice coil are opposite.

7. The speaker according to claim 5, wherein each of the flexible circuit boards comprises an outer fixing portion, an inner fixing portion, and a pair of elastic force arms; the outer fixing portion is fixed to the frame, the inner fixing portion is fixed to the supporting portions, the pair of the elastic force arms is respectively connected to the outer fixing portion and the inner fixing portion; the pair of the elastic force arms is symmetrically disposed on two sides of one of the third magnetic steels, each of the pair of the elastic force arms is disposed in a gap formed between adjacent two of the third magnetic steels.

8. The speaker according to claim 7, wherein the third pole core is annular, and the outer fixing portion is at least partially fixed to the third pole core.

9. The speaker according to claim 7, wherein the vibration system further comprises vibrating diaphragms, the vibrating diaphragms are attached to one side, distal from the sound film, of each of the flexible circuit boards; and the vibrating diaphragms are in one-to-one correspondence with the elastic force arms.

* * * * *